United States Patent
Phadnis et al.

(10) Patent No.: US 10,657,565 B2
(45) Date of Patent: May 19, 2020

(54) SYSTEMS AND METHODS FOR UPDATING WEBSITE MODULES

(71) Applicant: WAL-MART STORES, INC., Bentonville, AR (US)

(72) Inventors: Pallavi Mukund Phadnis, San Jose, CA (US); Marcenino Vivas Bautista, Mountain View, CA (US); Chandni Jain, Santa Clara, CA (US); Zuzar Fakhruddin Nafar, Mountain View, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 242 days.

(21) Appl. No.: 15/587,153

(22) Filed: May 4, 2017

(65) Prior Publication Data
US 2018/0322540 A1    Nov. 8, 2018

(51) Int. Cl.
*G06Q 10/06* (2012.01)
*G06Q 30/02* (2012.01)

(52) U.S. Cl.
CPC ..... *G06Q 30/0277* (2013.01); *G06Q 10/0633* (2013.01)

(58) Field of Classification Search
CPC ............ G06Q 30/0277; G06Q 10/0633
See application file for complete search history.

(56) References Cited

U.S. PATENT DOCUMENTS

| | | | | |
|---|---|---|---|---|
| 7,995,483 B1* | 8/2011 | Bayar | ................. | H04L 41/0893 370/241.1 |
| 8,570,877 B1* | 10/2013 | Bayar | ................. | H04L 41/0681 370/241.1 |
| 9,697,099 B2* | 7/2017 | Dubbels | ................. | G06F 16/313 |
| 10,504,172 B2* | 12/2019 | Tan | ................. | G06Q 30/0641 |
| 2004/0141003 A1* | 7/2004 | Nivers | ................. | G06Q 30/02 715/745 |
| 2008/0046274 A1* | 2/2008 | Geelen | ................. | G01C 21/32 717/176 |
| 2008/0311550 A1* | 12/2008 | Giambrone | ............ | G09B 19/00 434/353 |

(Continued)

*Primary Examiner* — Sujay Koneru
(74) *Attorney, Agent, or Firm* — Bryan Cave Leighton Paisner LLP

(57) ABSTRACT

Systems and methods including one or more processors and one or more non-transitory computer-readable media storing computing instructions configured to run on the one or more processors and perform acts of receiving initial product content for a product, generating modularized product content from the initial product content for displaying on a website, storing the modularized product content, coordinating displaying on the website the modularized product content for the product, receiving an error report of an error for the modularized product content displayed on the website, updating a rule for the modularized product content to correct the error in the modularized product content, generating an updated modularized product content for the product using the rule as updated, replacing the modularized product content with the updated modularized product content, and coordinating displaying on the website the product and the updated modularized product content for the product.

22 Claims, 6 Drawing Sheets

(56) References Cited

U.S. PATENT DOCUMENTS

| | | | | |
|---|---|---|---|---|
| 2009/0138320 A1* | 5/2009 | Schmidt | G06Q 10/06 | 705/14.4 |
| 2009/0222417 A1* | 9/2009 | Layman | G06Q 10/101 | |
| 2009/0222485 A1* | 9/2009 | Wassmann | G06F 16/951 | |
| 2009/0327865 A1* | 12/2009 | Li | G06F 17/273 | 715/234 |
| 2010/0095197 A1* | 4/2010 | Klevenz | G06F 17/2247 | 715/234 |
| 2011/0157226 A1* | 6/2011 | Ptucha | G06T 11/60 | 345/638 |
| 2011/0276435 A1* | 11/2011 | Arya | G06Q 30/00 | 705/27.1 |
| 2013/0066745 A1* | 3/2013 | de Heer | G06Q 30/0603 | 705/26.62 |
| 2013/0074051 A1* | 3/2013 | Freeman | G06F 11/3438 | 717/130 |
| 2014/0006927 A1* | 1/2014 | Byakod | G06Q 10/00 | 715/234 |
| 2014/0222759 A9 | 8/2014 | Varadharajan et al. | | |
| 2014/0279182 A1* | 9/2014 | Goodman | G06Q 30/0621 | 705/26.5 |
| 2014/0279195 A1* | 9/2014 | Kubicki | G06Q 30/0631 | 705/26.7 |
| 2014/0279548 A1* | 9/2014 | Wang | G06Q 30/012 | 705/50 |
| 2015/0293952 A1 | 10/2015 | Ogrinz | | |
| 2016/0275132 A1* | 9/2016 | Ande | G06F 16/213 | |
| 2016/0307100 A1* | 10/2016 | Cooper | G06F 3/0484 | |
| 2017/0083525 A1* | 3/2017 | Guney | G06F 16/24578 | |
| 2017/0148078 A1* | 5/2017 | Agarwal | G06F 16/242 | |
| 2017/0161243 A1* | 6/2017 | Manoraj | G06F 17/2288 | |
| 2017/0206574 A1* | 7/2017 | Sharma | G06Q 30/0643 | |
| 2018/0165364 A1* | 6/2018 | Mehta | G06F 9/54 | |
| 2018/0322540 A1* | 11/2018 | Phadnis | G06Q 30/0277 | |

* cited by examiner

SYSTEMS AND METHODS FOR UPDATING WEBSITE MODULES

TECHNICAL FIELD

This disclosure relates generally to updating modularized product content displayed on a website.

BACKGROUND

Various websites can be configured to display one or more modules on a webpage of the website. For example, product content for a product can be displayed in one or more modules on a webpage for the product on the website of an online retailer. The product content displayed in the one or more modules can include but is not limited to a short description for the product, a long description for the product, product specifications, nutrition facts, and so on. Each module displayed on the webpage can include one or more product attributes for the product.

Accurate product attribute data is very important for customers visiting the website of the online retailer. Occasionally, however, there can be one or more product data errors pertaining to a single product, an entire shelf (category or subcategory) of a plurality of products, or a certain module for a plurality of products. These errors can include but are not limited to: a module that is included on a certain shelf of a webpage for a product that should not be included on that certain shelf, a module that is excluded from a certain shelf of a webpage for a product that should not be excluded from that certain shelf, a product attribute that is included with a certain module for a product that should not be included with that certain module, a product attribute that is excluded from a certain module that should not be excluded from that certain module, a specific attribute value that is included with a certain module for a product that should not be included with that certain module, and a specific attribute value that is excluded from a certain module for a product that should not be excluded from that certain module.

BRIEF DESCRIPTION OF THE DRAWINGS

To facilitate further description of the embodiments, the following drawings are provided in which.

Figure 1:
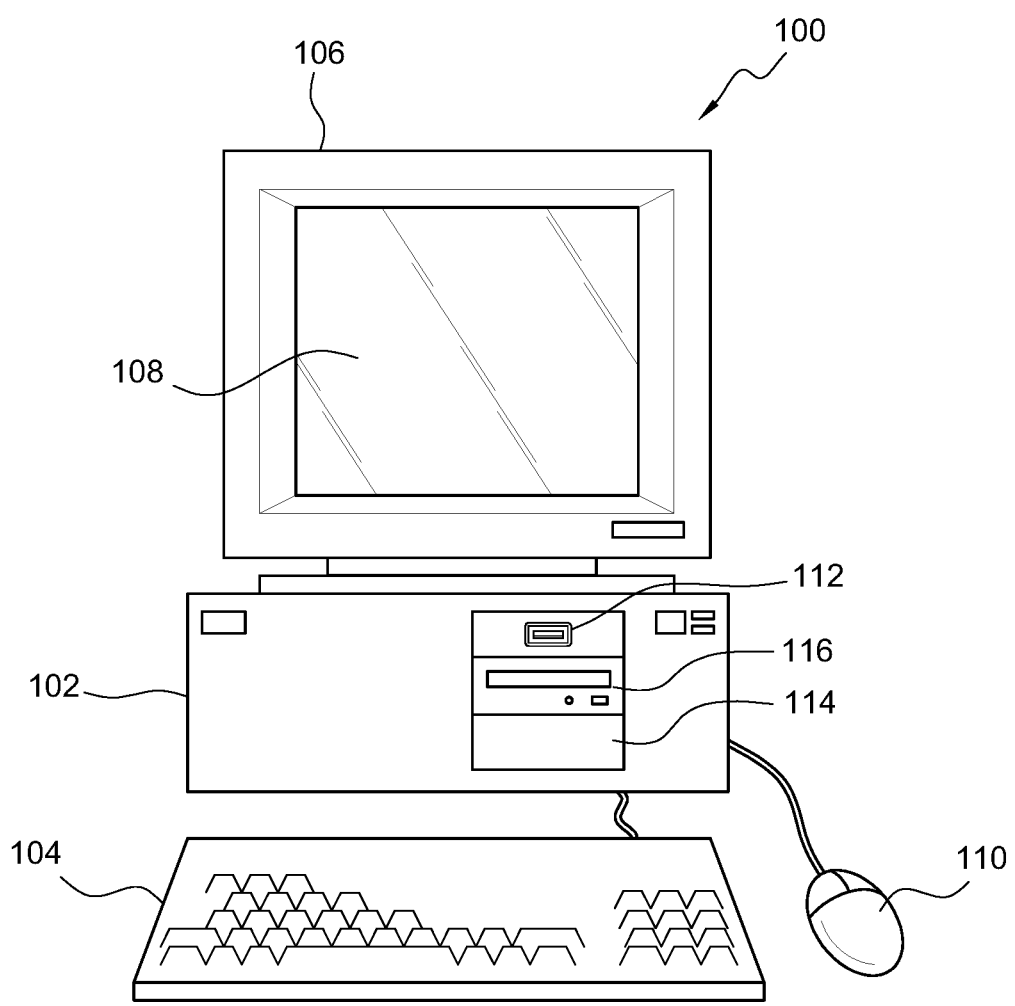
FIG. 1 illustrates a front elevational view of a computer system that is suitable for implementing various embodiments of the systems disclosed in FIGS. 3-6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of receiving initial product content for each product of a plurality of products. The one or more storage modules can be further configured to run on the one or more processing modules and perform an act of, for each product of the plurality of products, generating modularized product content from the initial product content for displaying on a website of an online retailer. The one or more storage modules can be further configured to run on the one or more processing modules and perform an act of storing the modularized product content for the plurality of products. The one or more storage modules can be further configured to run on the one or more processing modules and perform an act of coordinating displaying on the website of the online retailer a first product of the plurality of products and the modularized product content for the first product. The one or more storage modules can be further configured to run on the one or more processing modules and perform an act of receiving an error report of an error for the modularized product content for the first product displayed on the website of the online retailer. The one or more storage modules can be further configured to run on the one or more processing modules and perform an act of updating one or more rules for the modularized product content for the first product to correct the error in the modularized product content for the first product. The one or more storage modules can be further configured to run on the one or more processing modules and perform an act of generating an updated modularized product content for the first product using the one or more rules as updated. The one or more storage modules can be further configured to run on the one or more processing modules and perform an act of replacing the modularized product content for the first product with the updated modularized product content for the first product. The one or more storage modules can be further configured to run on the one or more processing modules and perform an act of coordinating displaying on the website of the online retailer the first product and the updated modularized product content for the first product.

Various embodiments include a method. The method can include receiving initial product content for each product of a plurality of products. The method also can include, for each product of the plurality of products, generating modularized product content from the initial product content for displaying on a website of an online retailer. The method also can include storing the modularized product content for the plurality of products. The method also can include coordinating displaying on the website of the online retailer a first product of the plurality of products and the modularized product content for the first product. The method also can include receiving an error report of an error for the modularized product content for the first product displayed on the website of the online retailer. The method also can include updating one or more rules for the modularized product content for the first product to correct the error in the modularized product content for the first product. The method also can include generating an updated modularized product content for the first product using the one or more rules as updated. The method also can include replacing the modularized product content for the first product with the updated modularized product content for the first product. The method also can include coordinating displaying on the website of the online retailer the first product and the updated modularized product content for the first product.

Figure 2:
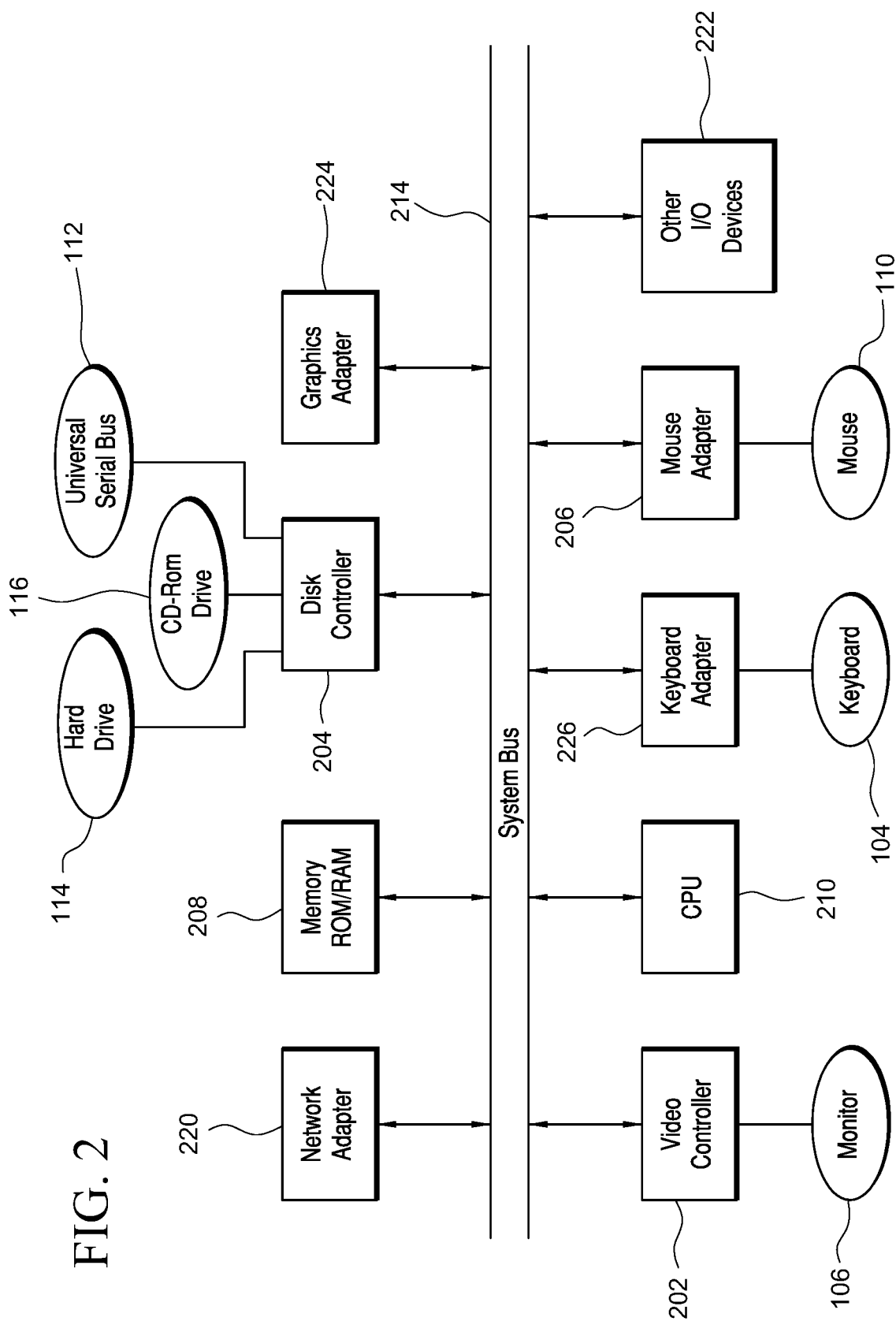
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
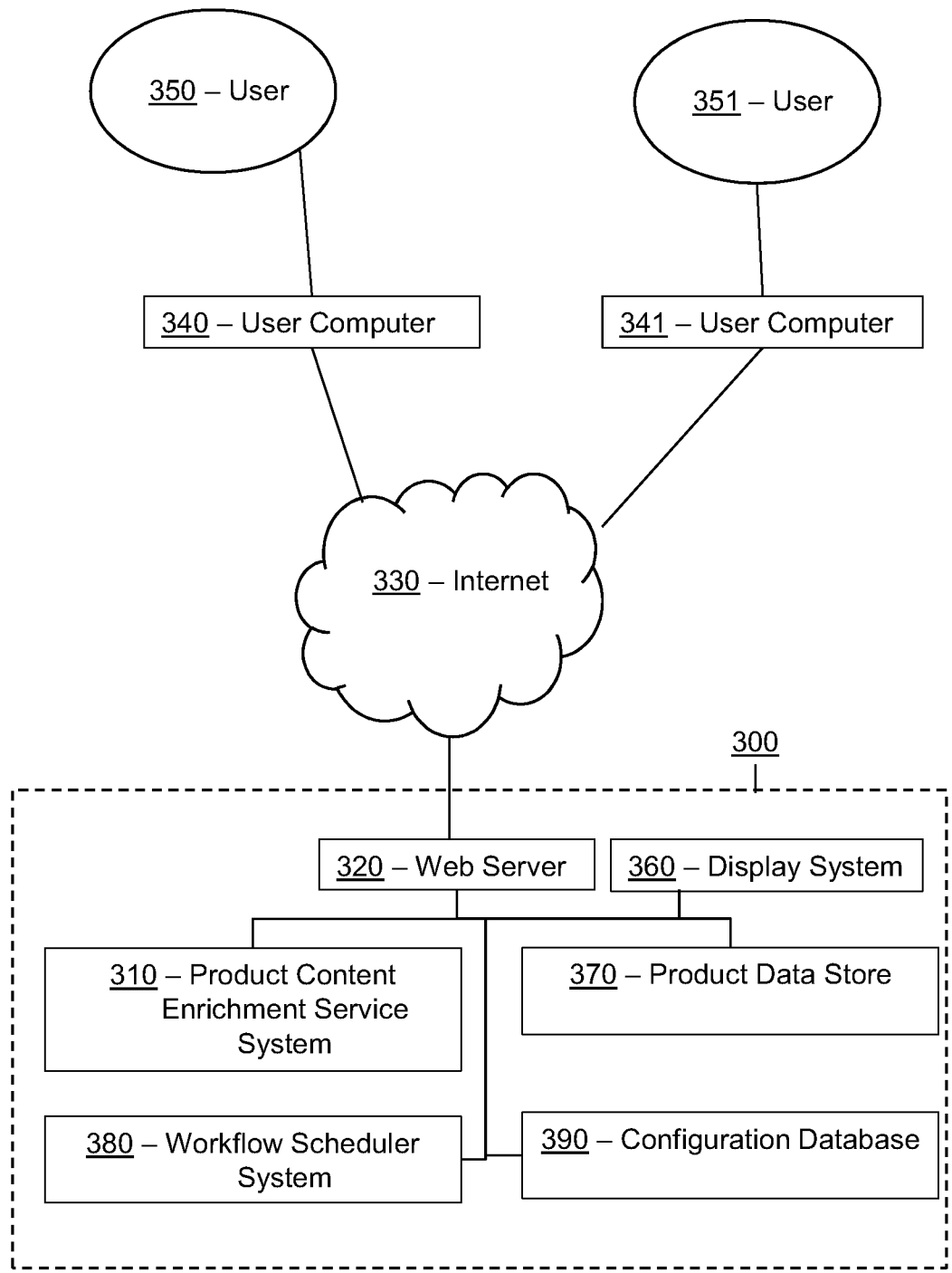
FIG. 3 illustrates a representative block diagram of a system, according to an embodiment.

Turning ahead in the drawings, FIG. 3 illustrates a block diagram of a system 300 that can be employed for updating website modules, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a product content enrichment service system 310, a web server 320, a display system 360, a product data store 370, a workflow scheduler system 380, and/or a configuration database 390. Product content enrichment service system 310, web server 320, display system 360, product data store 370, workflow scheduler system 380, and/or configuration database 390 can each be a computer system, such as computer system 100 (FIG. 1), as described above, and can each be a single computer, a single server, or a cluster or collection of computers or servers, or a cloud of computers or servers. In another embodiment, a single computer system can host each of two or more of product content enrichment service system 310, web server 320, display system 360, product data store 370, workflow scheduler system 380, and/or configuration database 390. Additional details regarding product content enrichment service system 310, web server 320, display system 360, product data store 370, workflow scheduler system 380, and configuration database 390 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, product content enrichment service system 310, web server 320, display system 360, product data store 370, workflow scheduler system 380, and/or configuration database 390 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) product content enrichment service system 310, web server 320, display system 360, product data store 370, workflow scheduler system 380, and/or configuration database 390 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of product content enrichment service system 310, web server 320, display system 360, product data store 370, workflow scheduler system 380, and/or configuration database 390. In a similar manner, the processing module(s) and the memory storage module(s) can be local and/or remote to each other.

In many embodiments, product content enrichment service system 310, web server 320, display system 360, product data store 370, workflow scheduler system 380, and/or configuration database 390 can be configured to communicate with one or more user computers 340 and 341. In some embodiments, user computers 340 and 341 also can be referred to as customer computers. In some embodiments, product content enrichment service system 310, web server 320, display system 360, product data store 370, workflow scheduler system 380, and/or configuration database 390 can communicate or interface (e.g., interact) with one or more customer computers (such as user computers 340 and 341) through a network or internet 330. Internet 330 can be an intranet that is not open to the public. Accordingly, in many embodiments, product content enrichment service system 310, web server 320, display system 360, product data store 370, workflow scheduler system 380, and/or configuration database 390 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, product content enrichment service system 310, web server 320, display system 360, product data store 370, workflow scheduler system 380, and/or configuration database 390 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between product content enrichment service system 310, web server 320, display system 360, product data store 370, workflow scheduler system 380, configuration database 390, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
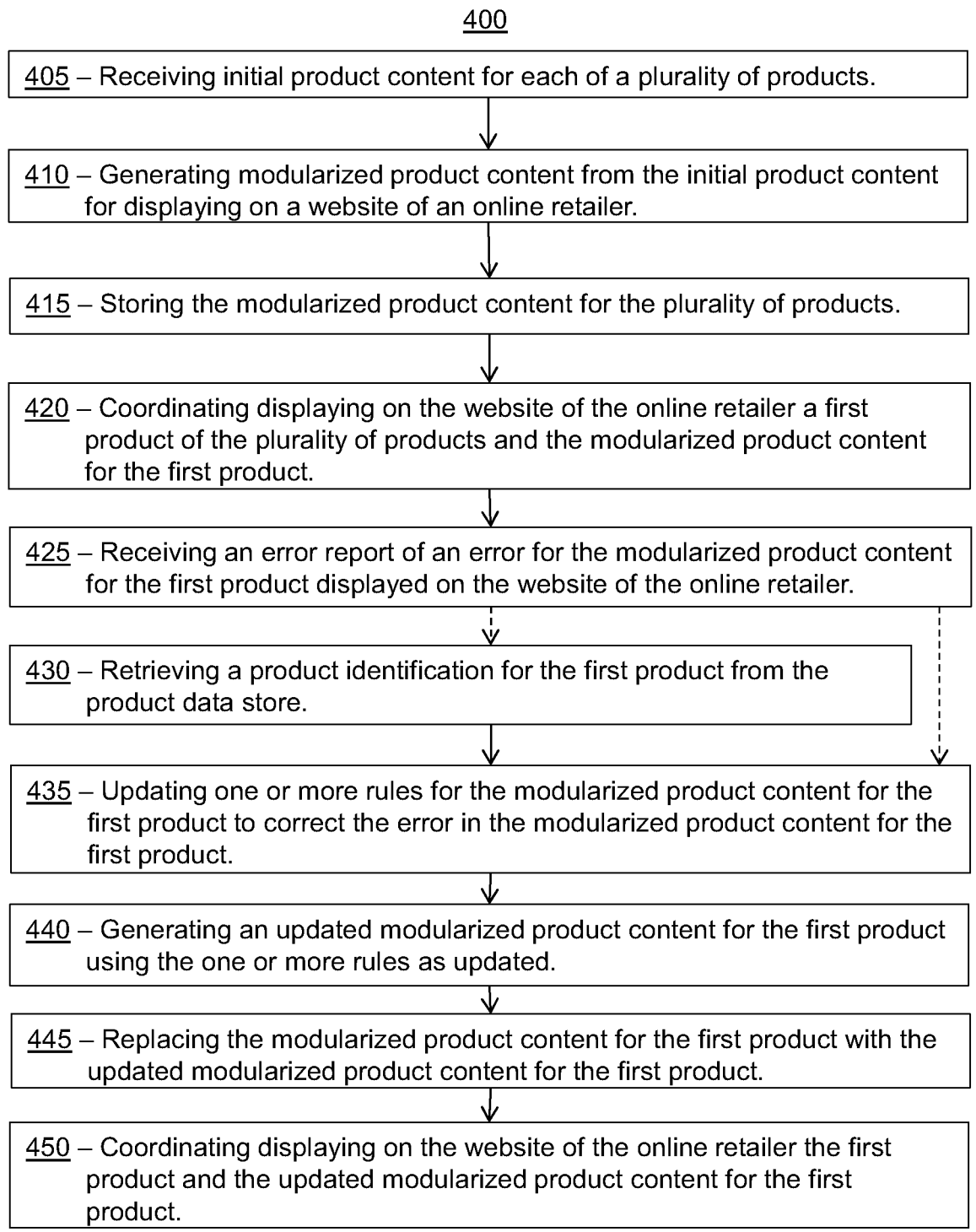
FIG. 4 is a flowchart for a method, according to certain embodiments.
Figure 5:
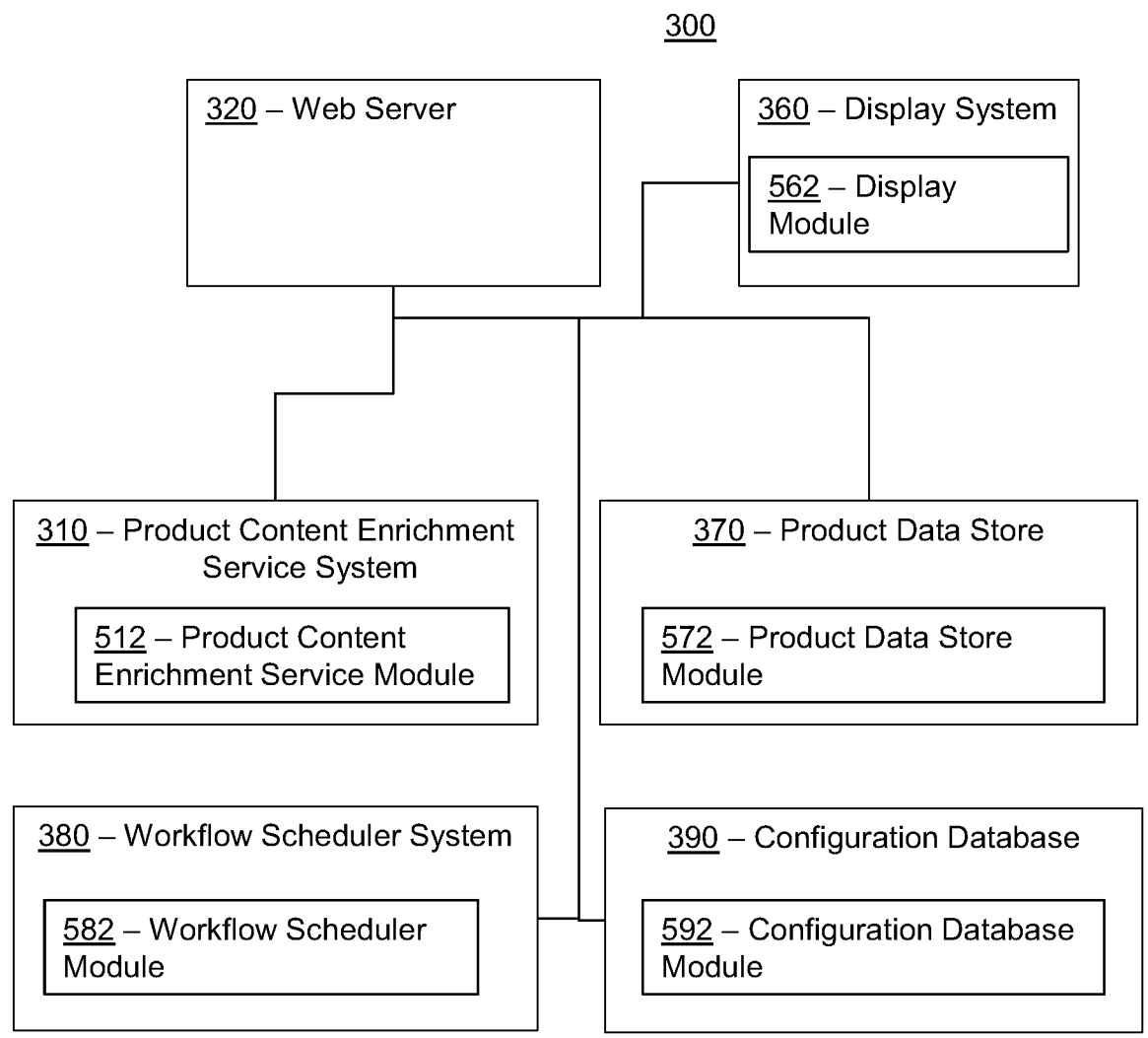
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, 572, 582, and/or 592 (FIG. 5). Such non-transitory memory storage modules can be part of a computer system such as product content enrichment service system 310, web server 320, display system 360, product data store 370, workflow scheduler system 380, and/or configuration database 390 (FIGS. 3 & 5). The processing module(s) can be similar or identical to the processing module(s) described above with respect to computer system 100 (FIG. 1).

Various websites can be configured to display one or more modules on a webpage of the website. For example, product content for a product can be displayed in one or more modules on a webpage for the product on the website of an online retailer. The product content displayed in the one or more modules can include but is not limited to a short description for the product, a long description for the product, product specifications, nutrition facts, and so on. Each module displayed on the webpage can include one or more product attributes for the product.

Accurate product attribute data is important for customers visiting the website of the online retailer. Occasionally, however, there can be one or more product data errors pertaining to a single product, an entire shelf (category or subcategory) of a plurality of products, or a certain module for a plurality of products. These errors can include but are not limited to: a module that is included on a certain shelf of a webpage for a product that should not be included on that certain shelf, a module that is excluded from a certain shelf of a webpage for a product that should not be excluded from that certain shelf, a product attribute that is included with a certain module for a product that should not be included with that certain module, a product attribute that is excluded from a certain module that should not be excluded from that certain module, a specific attribute value that is included with a certain module for a product that should not be included with that certain module, and a specific attribute value that is excluded from a certain module for a product that should not be excluded from that certain module.

As shall be described in greater detail below, various embodiments of method 400 dynamically incorporate a required correction to an error in a module, such as but not limited to the inclusions or exclusions described above. Moreover, one or more embodiments of method 400 allow for identification of a product in the product data stores that require updating, and subsequently updating of product content for the product to reflect the changes necessary to correct the error.

One or more embodiments of method 400 can utilize product content enrichment service system 310 (FIG. 3), web server 320 (FIG. 3), display system 360 (FIG. 3), product data store 370 (FIG. 3), workflow scheduler system 380 (FIG. 3), and/or configuration database 390 (FIG. 3) to perform the activities described below. In some embodiments, product content enrichment service system 310 (FIG. 3), product data store 370 (FIG. 3), workflow scheduler system 380 (FIG. 3), and configuration database 390 (FIG. 3) comprise at least one of the one or more processors and/or the one or more non-transitory computer-readable media. In some embodiments, method 400 can be implemented via execution of computing instructions configured to run at a plurality of processors and configured to be stored at a plurality of computer-readable media. More particularly, method 400 can be implemented via execution of computing instructions configured to run at one or more of: (1) product content enrichment service system 310 (FIG. 3) comprising a first processor of the plurality of processors and a first non-transitory computer-readable media of the plurality of non-transitory computer-readable media; (2) product data store 370 (FIG. 3) comprising a second processor of the plurality of processors and a second non-transitory computer-readable media of the plurality of non-transitory computer-readable media; (3) configuration database 390 (FIG. 3) comprising a third processor of the plurality of processors and a third non-transitory computer-readable media of the plurality of non-transitory computer-readable media; and (4) workflow scheduler system 380 (FIG. 3) comprising a fourth processor of the plurality of processors and a fourth non-transitory computer-readable media of the plurality of non-transitory computer-readable media.

Method 400 can comprise an activity 405 of receiving initial product content for each product of a plurality of products. In some embodiments, activity 405 can comprise receiving, by product content enrichment service system 310 (FIG. 3), the initial product content for each product of the plurality of products. The initial product content received can comprise at least one of (1) initial product content for one or more new products of the plurality of products or (2) additional initial product content for one or more existing products of the plurality of products. In many embodiments, the initial product content is received as part of a real-time product content ingestion pipeline. The real-time product content ingestion pipeline can continuously and/or dynamically provide initial product content from suppliers, sellers, and the like. The initial product content can include a product identification for the product, and product content such as product attributes, product specifications, product descriptions, and the like.

Method 400 can further comprise an activity 410 of, for each product of the plurality of products, generating modularized product content from the initial product content for displaying on a website of an online retailer. While reference is made herein to an online retailer, the online retailer can comprise an exclusively online retailer, or an online retailer also associated with a brick and mortar retailer. In some embodiments, activity 410 can comprise generating, by product content enrichment service system 310 (FIG. 3), the modularized product content from the initial product content for displaying on the website of the online retailer from the initial product content. Activity 410 can comprise generating modularized product content in JSON or other acceptable modularized format. The modularized product content can be generated by applying one or more rules for the product as-received from configuration database 390 (FIG. 3).

Method 400 can further comprise an activity 415 of storing the modularized product content for the plurality of products. More particularly, activity 415 can comprise storing, by product data store 370 (FIG. 3), the modularized product content for the plurality of products. In some embodiments, storing also can comprise transmitting the modularized product content from product content enrichment service 310 (FIG. 3) to product data store 370 (FIG. 3) for storage. As noted above, the modularized product content for the plurality of products can be stored in product data store 370 (FIG. 3) in JSON or other acceptable modularized format. Product data store can comprise but is not limited to a database management system configured to store large amounts of data across a plurality of servers, such as but not limited to a Cassandra™ database.

In some embodiments, activity 415 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

Method 400 can further comprise an activity 420 of coordinating displaying on the website of the online retailer a first product of the plurality of products and the modularized product content for the first product. For example, the first product and the modularized product content for the first product can be displayed on a webpage for the first product on the website of the online retailer.

Method 400 can further comprise an activity 425 of receiving an error report of an error for the modularized product content for the first product displayed on the website of the online retailer. In some embodiments, activity 425 can comprise receiving, by the configuration database and from the website of the online retailer, the error report for the error in the modularized product content for the first product displayed on the website of the online retailer.

In some embodiments, the error report can be information about an error on the webpage for the product, and no formal report of the error is required. For example, in some embodiments, a customer or employee of the online retailer can report a product content error from a webpage for the product. Thus, in some embodiments, reporting of modularized product content errors on the website of the online retailer can comprise using crowdsourcing to report modularized product content errors on the website of the online retailer. In other embodiments, the modularized product content errors can be identified by one or more members of a specialized team instructed by the online retailer to identify modularized product content errors.

In various embodiments, the error in the modularized product content for the first product can comprise one or more of: (1) inclusion of the modularized product content for the first product on a shelf of the website of the online retailer; (2) exclusion of the modularized product content for the first product on the shelf of the website of the online retailer; (3) inclusion of an attribute in the modularized product content for the first product; (4) exclusion of the attribute in the modularized product content for the first product; (5) inclusion of an attribute value in the modularized product content for the first product; or (6) exclusion of the attribute value in the modularized product content for the first product. Thus, while the error may be reported from display of the first product, the error also can apply to other products for which a shelf might apply. For example, the shelf for a shampoo product can comprise a modularized product content error of including nutrition facts attributes. By way of another example, product specifications for a soccer goal can comprises a modularized product content error of including an "occasion" product attribute of "Christmas" in the product specifications.

With respect to an error in the modularized product content for the first product comprising inclusion of the modularized product content for the first product on a shelf of the website of the online retailer, if, for example, the first products belongs on the shampoo shelf, an ingredients module might be necessary, but a nutrition facts module should not be included. Therefore, an error in the modularized product content can comprise inclusion of the nutrition facts module for products belonging on the shampoo shelf of the website.

With respect to an error in the modularized product content for the first product comprising exclusion of the modularized product content for the first product on the shelf of the website of the online retailer, if, for example, the first product belongs on the drug shelf, the first product should have a drug facts module. Therefore, an error in the modularized product content can comprise exclusion of the required drug facts from the modularized product content.

With respect to an error in the modularized product content for the first product comprising inclusion of an attribute in the modularized product content for the first product, if, for example, the first product belongs to a textile shelf such as clothing or leather, then a product attribute such as "does not come with batteries" should not be displayed in the modularized product content. Therefore, an error in the modularized product content can comprise inclusion of "does not come with batteries" as an attribute of the modularized product content for a clothing item.

With respect to an error in the modularized product content for the first product comprising exclusion of the attribute in the modularized product content for the first product, if, for example, the first product requires assembly, then the modularized product content for the first product should include "assembled product dimensions." Therefore, an error in the modularized product content can comprise exclusion of "assembled product dimensions."

With respect to an error in the modularized product content for the first product comprising inclusion of an attribute value in the modularized product content for the first product, if, for example, the modularized product content for the first product includes a non-readable or otherwise undesirable value such as "to be determined" or an unusable html address, then the attribute value is an error. Therefore, an error in the modularized product content can comprise inclusion of non-readable or otherwise undesirable attribute value in the modularized product content for a product.

With respect to an error in the modularized product content for the first product comprising exclusion of the attribute value in the modularized product content for the first product, if, for example, the first product belongs to a textile shelf like clothing or leather, then the modularized product content should display "country of origin." Therefore, an error in the modularized product content can comprise exclusion of "country of origin" from the modularized product content for a clothing or textile product.

In some embodiments, when an error report is received, system 300 (FIG. 3) can create a ticket indicating an error in the modularized product content for the first product. Method 400 can further comprise an activity a validating the error in the error report, and/or approving the necessary inclusion or exclusion of product content. In some embodiments, validating the error can be performed by a human.

Method 400 can optionally comprise an activity 430 of retrieving a product identification for the first product from the product data store. More particularly, activity 430 can comprise retrieving, by workflow scheduler system 380, the product identification for the first product from the product data store. In some embodiments, the product identification can be automatically retrieved by workflow scheduler system 380 (FIG. 3) from product data store 370 (FIG. 3) when the error is validated and/or the necessary inclusion or exclusion is approved.

In some embodiments, method 400 can further comprise an activity of transmitting, from product data store 370 (FIG. 3) to product content enrichment service system (FIG. 3), the product identification for the first product. More particularly, method 400 can comprise an activity of transmitting, from workflow scheduler system 380 (FIG. 3) to product content enrichment service system 310 (FIG. 3), the product identification for the first product received from product data store 370 (FIG. 3). In some embodiments, workflow scheduler system 380 (FIG. 3) can call or transmit the product identification for the first product to a re-generate application program interface (API) of product content enrichment service system 310 (FIG. 3), and the re-generate API can pull the initial product content for the first product from an additional product data store where the initial product content is stored in its original format.

Method 400 can further comprise an activity 435 of updating one or more rules for the modularized product content for the first product to correct the error in the modularized product content for the first product. More particularly, activity 435 can comprise updating, on configuration database 390 (FIG. 3), the one or more rules to correct the error in the modularized product content for the first product. In some embodiments, activity 430 and activity 435 can be performed substantially simultaneously with one another, or activity 435 can be performed before activity 430. In one or more embodiments, the one or more rules for the modularized product content for the first product can be updated by a user of system 300 (FIG. 3) using a self-service tool. The one or more rules for the first product (or each product of the plurality of products) can comprise rules for the display of a module at the shelf level, the module level, and/or the attribute level.

Method 400 can further comprise an activity 440 of generating an updated modularized product content for the first product using the one or more rules as updated. More particularly, activity 440 can comprise generating, by product content enrichment service system 310 (FIG. 3), the updated modularized product content for the first product using the one or more rules as updated from configuration database 390 (FIG. 3). In some embodiments, the one or more rules as updated can be applied to the initial product content for the first product received from the additional data store. In many embodiments, the updated modularized product content can be automatically generated by product content enrichment system 310 (FIG. 3) responsive to receiving the product identification for the first product from workflow scheduler system 380 (FIG. 3). For example, when the product identification for the first product is received at product content enrichment service system 310 (FIG. 3), product content enrichment service system 310 (FIG. 3) can automatically read the one or more rules as updated in configuration database 390 (FIG. 3) and apply the one or more rules as updated to the initial product content pulled from the additional data store to generate an updated modularized product content for the first product.

Method 400 can further comprise an activity 445 of replacing the modularized product content for the first product with the updated modularized product content for the first product. More particularly, activity 445 can comprise replacing, in product data store 370 (FIG. 3), the modularized product content for the first product with the updated modularized product content for the first product. Replacing the modularized product content can comprise transmitting the updated modularized product content for the first product from product content enrichment service system 310 (FIG. 3) to product data store 370 (FIG. 3) to replace the modularized product content for the first product in product data store 370 (FIG. 3) with the updated modularized product content for the first product.

Method 400 can further comprise an activity 450 of coordinating displaying on the website of the online retailer the first product and the updated modularized product content for the first product. For example, the first product and the updated modularized product content for the first product can be displayed on a webpage for the first product on the website of the online retailer.

In some embodiments, the one or more rules as updated can be applied to any additional product content received for the first product received by product content enrichment service system 310 (FIG. 3). For example, method 400 can optionally comprise activities of receiving additional product content for the first product and generating additional modularized product content for the first product using the one or more rules as updated and the additional product content. Similar to previous activities, method 400 can further comprise an activity of transmitting and/or storing the additional modularized product content for the first product, and then coordinating displaying on the website of the online retailer the first product, and the additional modularized product content, and the updated modularized product content for the first product.

FIG. 5 illustrates a block diagram of a portion of system 300 comprising product content enrichment service system 310, web server 320, display system 360, product data store 370, workflow scheduler system 380, and configuration database 390 according to the embodiment shown in FIG. 3. Each of product content enrichment service system 310, web server 320, display system 360, product data store 370, workflow scheduler system 380, and configuration database 390 is merely exemplary and not limited to the embodiments presented herein. Each of product content enrichment service system 310, web server 320, display system 360, product data store 370, workflow scheduler system 380, and/or configuration database 390 can be employed in many different embodiments or examples not specifically depicted or described herein. In some embodiments, certain elements or modules of product content enrichment service system 310, web server 320, display system 360, product data store 370, workflow scheduler system 380, and/or configuration database 390 can perform various procedures, processes, and/or acts. In other embodiments, the procedures, processes, and/or acts can be performed by other suitable elements or modules.

In many embodiments, product content enrichment service system 310 can comprise non-transitory memory storage module 512. Memory storage module 512 can be referred to as product content enrichment service module 512. In many embodiments, product content enrichment service module 512 can store computing instructions configured to run on one or more processing modules and perform one or more acts of method 400 (FIG. 4) (e.g., activity 405 of receiving initial product content for each product of a plurality of products, activity 410 of generating modularized product content from the initial product content for displaying on a website of an online retailer, and activity 440 of generating an updated modularized product content for the first product using the one or more rules as updated (FIG. 4)).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., activity 420 of coordinating displaying on the website of the online retailer a first product of the plurality of products and the modularized product content for the first product, and activity 450 of coordinating displaying on the website of the online retailer the first product and the updated modularized product content for the first product (FIG. 4)).

In many embodiments, product data store 370 can comprise non-transitory memory storage module 572. Memory storage module 572 can be referred to as product data store module 572. In many embodiments, product data store module 572 can store computing instructions configured to run on one or more processing modules and perform one or more acts of method 400 (FIG. 4) (e.g., activity 415 of storing the modularized product content for the plurality of products, and activity 445 of replacing the modularized product content for the first product with the updated modularized product content for the first product (FIG. 4)).

In many embodiments, workflow scheduler system 380 can comprise non-transitory memory storage module 582. Memory storage module 582 can be referred to as workflow scheduler module 582. In many embodiments, workflow scheduler module 582 can store computing instructions configured to run on one or more processing modules and perform one or more acts of method 400 (FIG. 4) (e.g., activity 430 of retrieving a product identification for the first product from the product data store (FIG. 4)).

In many embodiments, configuration database 390 can comprise non-transitory memory storage module 592. Memory storage module 592 can be referred to as configuration database module 592. In many embodiments, configuration database module 592 can store computing instructions configured to run on one or more processing modules and perform one or more acts of method 400 (e.g., activity 425 of receiving an error report of an error for the modularized product content for the first product displayed on the website of the online retailer, and activity 435 of updating one or more rules for the modularized product content for the first product to correct the error in the modularized product content for the first product (FIG. 4)).

Figure 6:
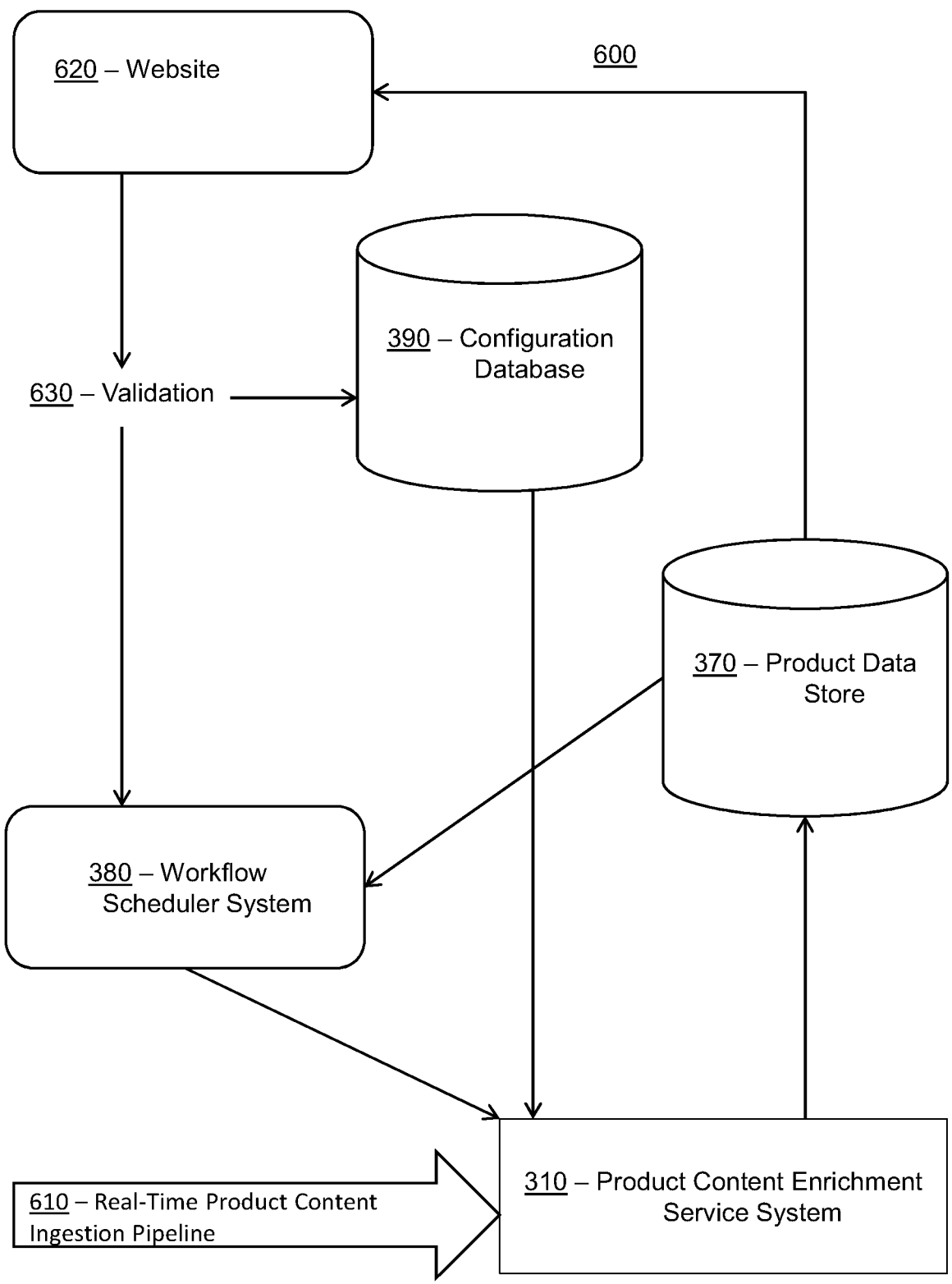
FIG. 6 is a flow diagram for a system, according to additional embodiments.

Turning to FIG. 6, a non-limiting example of a flow diagram 600 for systems and methods of updating modules on a website is provided. Flow diagram 600 can incorporate any of the activities of method 400 (FIG. 4). In some embodiments, product content enrichment service system 310 receives product content for a plurality of products from real-time product content ingestion pipeline 610. In some embodiments, after modularized product content for the plurality of products is generated by product content enrichment service system 310, the modularized product content is transmitted to product data store 370 for storage. In some embodiments, website 620 for the online retailer can access the modularized product content from product data store 370 for display on website 620. In some embodiments, when an error is reported from website 620, the error is validated at 630. Validation of the error can trigger workflow scheduler system 380 to identify and re-ingest an affected product from product data store 370. Validation of the error also can allow for updating of one or more rules for the affected product in configuration database 390. In some embodiments, workflow scheduler system 380 also can call the regenerate API of product content enrichment service system 310 to pull the initial product content for the affected product from an additional database. In some embodiments, product content enrichment service system 310 can then automatically read the one or more rules as updated in configuration database 390 and apply the one or more rules as updated to the initial product content for the affected product to generated updated modularized product content. The updated modularized product content can then be sent to product data store 370 to replace the modularized product content previously sent to product data store 370, and the updated modularized product content for the affected product can then be displayed on website 620.

Although systems and methods for updating website modules have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform acts of:
     continually receiving respective initial product content for each respective product of a plurality of products via a real-time product content ingestion pipeline, the respective initial product content for each respective product of the plurality of products comprising a plurality of respective attributes of each respective product of the plurality of products;
     for each respective product of the plurality of products, generating respective modularized product content from the respective initial product content, wherein the respective modularized product content:
       is configured for displaying on a website of an online retailer; and
       comprises a respective module for each respective attribute of a respective product of the plurality of products, wherein the plurality of respective attributes comprise the each respective attribute;

storing the respective modularized product content for each respective product of the plurality of products in the one or more non-transitory computer-readable media;

coordinating displaying on the website of the online retailer of:
　a first product of the plurality of products; and
　at least a portion of first modularized product content for the first product;

receiving an error report of one or more errors for the first modularized product content for the first product displayed on the website of the online retailer, the error report indicating:
　that a module of the first modularized product content is not displayed on the website of the online retailer; and
　that a second module unassociated with the first product is displayed on the website of the online retailor;

updating one or more rules for the first modularized product content for the first product to correct the one or more errors in the first modularized product content for the first product by:
　determining that all modules of the first modularized product content for the first product are displayed on the website of the online retailer; and
　excluding the second module unassociated with the first product from only the first modularized product content for the first product;

generating an updated modularized product content for the first product using the one or more rules, as updated;

replacing the first modularized product content for the first product with the updated modularized product content for the first product; and coordinating displaying, on the website of the online retailer, of:
　the first product; and
　the updated modularized product content for the first product.

2. The system of claim 1, wherein:

continually receiving the respective initial product content comprises:
　continually receiving, by a product content enrichment service system, the respective initial product content for each respective product of the plurality of products;

generating the respective modularized product content comprises:
　generating, by the product content enrichment service system, the respective modularized product content from the respective initial product content, the respective modularized product content configured for displaying on the website of the online retailer;

storing the respective modularized product content comprises:
　storing, by a product data store comprising the one or more non-transitory computer-readable media, the respective modularized product content for the plurality of products, wherein the storing comprises transmitting the respective modularized product content from the product content enrichment service system to the product data store;

receiving the error report comprises:
　receiving, by a configuration database and from the website, the error report of the one or more errors in the first modularized product content for the first product displayed on the website of the online retailer;

updating the one or more rules comprises:
　updating, on the configuration database, the one or more rules to correct the one or more errors in the first modularized product content for the first product;

generating the updated modularized product content comprises:
　generating, by the product content enrichment service system, the updated modularized product content for the first product using the one or more rules, as updated, from the configuration database; and replacing the first modularized product content comprises:
　replacing, in the product data store, the first modularized product content for the first product with the updated modularized product content for the first product.

3. The system of claim 2, wherein:
the product content enrichment service system, the product data store, and the configuration database comprise at least one of the one or more processors or the one or more non-transitory computer-readable media.

4. The system of claim 1, wherein:
the one or more processors comprise a plurality of processors;
the one or more non-transitory computer-readable media comprise a plurality of non-transitory computer-readable media;
the system further comprises:
　(1) a product content enrichment service system comprising a first processor of the plurality of processors and a first non-transitory computer-readable media of the plurality of non-transitory computer-readable media;
　(2) a product data store comprising a second processor of the plurality of processors and a second non-transitory computer-readable media of the plurality of non-transitory computer-readable media;
　(3) a configuration database comprising a third processor of the plurality of processors and a third non-transitory computer-readable media of the plurality of non-transitory computer-readable media; and
　(4) a workflow scheduler system comprising a fourth processor of the plurality of processors and a fourth non-transitory computer-readable media of the plurality of non-transitory computer-readable media;

continually receiving the respective initial product content comprises:
　continually receiving, by the product content enrichment service system, the respective initial product content for each respective product of the plurality of products;

generating the respective modularized product content comprises:
　generating, by the product content enrichment service system, the respective modularized product content from the respective initial product content for displaying on the website of the online retailer from the respective initial product content;

storing the respective modularized product content comprises:
　storing, by the product data store, the respective modularized product content for the plurality of products;

receiving the error report comprises:
  receiving, by the configuration database, the error report of the one or more errors in the first modularized product content for the first product displayed on the website of the online retailer;
updating the one or more rules comprises:
  updating, on the configuration database, the one or more rules to correct the one or more errors in the first modularized product content for the first product;
the fourth non-transitory computer-readable media of the workflow scheduler system is configured to run on the fourth processor of the workflow scheduler system and perform an act of:
  retrieving a product identification for the first product from the product data store;
generating the updated modularized product content comprises:
  generating, by the product content enrichment service system, the updated modularized product content for the first product using the one or more rules as updated from the configuration database; and
replacing the first modularized product content comprises:
  replacing, in the product data store, the first modularized product content for the first product with the updated modularized product content for the first product.

5. The system of claim 4, wherein:
the fourth non-transitory computer-readable media of the workflow scheduler system is configured to run on the fourth processor of the workflow scheduler system and perform an act of:
  transmitting the product identification for the first product from the workflow scheduler system to the product content enrichment service system;
the first non-transitory computer-readable media of the product content enrichment service system is configured to run on the first processor of the product content enrichment service system and perform an act of:
  retrieving first initial product content for the first product from an additional data store using the product identification for the first product; and
generating, by the product content enrichment service system, the updated modularized product content comprises:
  generating, by the product content enrichment service system, the updated modularized product content for the first product by applying the one or more rules, as updated, from the configuration database to the first initial product content for the first product, as retrieved, from the additional data store.

6. The system of claim 5, wherein:
receiving the error report further comprises:
  transmitting the error report of the one or more errors to a validation terminal; and
  receiving, from the validation terminal, a validation of the one or more errors;
retrieving the product identification comprises:
  in response to receiving the validation of the one or more errors, automatically retrieving, by the workflow scheduler system, the product identification for the first product from the product data store; and
generating the updated modularized product content comprises:
  automatically generating, by the product content enrichment service system, the updated modularized product content for the first product by applying the one or more rules as updated from the configuration database to the first initial product content for the first product received from the additional data store responsive to receiving the product identification for the first product from the workflow scheduler system.

7. The system of claim 1, wherein the one or more non-transitory computer-readable media storing the computing instructions are further configured to run on the one or more processors and perform acts of:
  receiving additional product content for the first product;
  generating additional modularized product content for the first product using:
    the one or more rules, as updated; and
    the additional product content;
  storing the additional modularized product content for the first product in the one or more non-transitory computer-readable media; and
  coordinating displaying, on the website of the online retailer:
    the first product;
    the additional modularized product content; and
    the updated modularized product content for the first product.

8. The system of claim 1, wherein the one or more errors in the first modularized product content for the first product comprises at least one of:
  (1) inclusion of the first modularized product content for the first product on a shelf of the website of the online retailer;
  (2) exclusion of the first modularized product content for the first product on the shelf of the website of the online retailer;
  (3) inclusion of an attribute in the first modularized product content for the first product;
  (4) exclusion of the attribute in the first modularized product content for the first product;
  (5) inclusion of an attribute value in the first modularized product content for the first product; or
  (6) exclusion of the attribute value in the first modularized product content for the first product.

9. The system of claim 1, wherein receiving the error report comprises:
  receiving the error report that a user of the website has reported the one or more errors for the first modularized product content for the first product displayed on the website of the online retailer.

10. The system of claim 1, wherein continually receiving the respective initial product content for each respective product of the plurality of products comprises:
  receiving at least one of:
    (1) respective initial product content for one or more new products of the plurality of products; or
    (2) respective additional initial product content for one or more existing products of the plurality of products.

11. The system of claim 1, wherein:
the one or more processors comprise a plurality of processors;
the one or more non-transitory computer-readable media comprise a plurality of non-transitory computer-readable media;
the system further comprises:
  (1) a product content enrichment service system comprising a first processor of the plurality of processors and a first non-transitory computer-readable media of the plurality of non-transitory computer-readable media;
(2) a product data store comprising a second processor of the plurality of processors and a second non-transitory computer-readable media of the plurality of non-transitory computer-readable media;
(3) a configuration database comprising a third processor of the plurality of processors and a third non-transitory computer-readable media of the plurality of non-transitory computer-readable media; and
(4) a workflow scheduler system comprising a fourth processor of the plurality of processors and a fourth non-transitory computer-readable media of the plurality of non-transitory computer-readable media;
continually receiving the respective initial product content comprises:
receiving, by the product content enrichment service system, at least one of:
(1) respective initial product content for one or more new products of the plurality of products; or
(2) respective additional initial product content for one or more existing products of the plurality of products;
generating the respective modularized product content comprises:
generating, by the product content enrichment service system, the respective modularized product content from the respective initial product content for displaying on the website of the online retailer;
storing the respective modularized product content comprises:
storing, by the product data store, the respective modularized product content for the plurality of products;
receiving the error report comprises:
receiving, by the configuration database, the error report that a user of the website has reported the one or more errors in the first modularized product content for the first product displayed on the website of the online retailer;
transmitting the error report of the one or more errors to a validation terminal; and
receiving, from the validation terminal, a validation of the one or more errors;
updating the one or more rules comprises:
updating, on the configuration database, the one or more rules to correct the one or more errors in the first modularized product content for the first product;
replacing the first modularized product content comprises:
replacing, in the product data store, the first modularized product content with the updated modularized product content for the first product;
the fourth non-transitory computer-readable media of the workflow scheduler system is configured to run on the fourth processor of the workflow scheduler system and perform an act of:
transmitting a product identification for the first product to the product content enrichment service system;
the first non-transitory computer-readable media of the product content enrichment service system is configured to run on the first processor of the product content enrichment service system and perform acts of:
retrieving first initial product content for the first product from an additional data store using the product identification for the first product;
receiving, by the product content enrichment service system, additional product content for the first product; and
generating, by the product content enrichment service system, additional modularized product content for the first product using:
the one or more rules, as updated; and
the additional product content;
the fourth non-transitory computer-readable media of the workflow scheduler system is further configured to run on the fourth processor of the workflow scheduler system and perform an act of:
in response to receiving the validation of the one or more errors, automatically retrieving the product identification for the first product from the product data store;
generating, by the product content enrichment service system, the updated modularized product content comprises:
automatically generating, by the product content enrichment service system, the updated modularized product content for the first product by applying the one or more rules, as updated, from the configuration database to the first initial product content for the first product retrieved from the additional data store responsive to receiving the product identification for the first product from the workflow scheduler system;
the second non-transitory computer-readable media of the product data store is configured to run on the second processor of the product data store and perform acts of:
storing the additional modularized product content for the first product; and
coordinating displaying, on the website of the online retailer, the updated modularized product content; and
the one or more errors in the first modularized product content for the first product comprises at least one of:
(1) inclusion of the first modularized product content for the first product on a shelf of the website of the online retailer;
(2) exclusion of the first modularized product content for the first product on the shelf of the website of the online retailer;
(3) inclusion of an attribute in the first modularized product content for the first product;
(4) exclusion of the attribute in the first modularized product content for the first product;
(5) inclusion of an attribute value in the first modularized product content for the first product; or
(6) exclusion of the attribute value in the first modularized product content for the first product.

12. A method being implemented via execution of computing instructions configured to run at one or more processors and configured to be stored at one or more non-transitory computer-readable media, the method comprising:
continually receiving respective initial product content for each respective product of a plurality of products via a real-time product content ingestion pipeline, the respective initial product content for each respective product of the plurality of products comprising a plurality of respective attributes of each respective product of the plurality of products;
for each respective product of the plurality of products, generating respective modularized product content from the respective initial product content, wherein the respective modularized product content:

is configured for displaying on a website of an online retailer; and comprises a respective module for each respective attribute of a respective product of the plurality of products, wherein the plurality of respective attributes comprise the each respective attribute;

storing the respective modularized product content for each respective product of the plurality of products in the one or more non-transitory computer-readable media;

coordinating displaying on the website of the online retailer of:
 a first product of the plurality of products; and
 at least a portion of first modularized product content for the first product;

receiving an error report of one or more errors for the first modularized product content for the first product displayed on the website of the online retailer, the error report indicating:
 that a module of the first modularized product content is not displayed on the website of the online retailer; and
 that a second module unassociated with the first product is displayed on the website of the online retailer;

updating one or more rules for the first modularized product content for the first product to correct the one or more errors in the first modularized product content for the first product by:
 determining that all modules of the first modularized product content for the first product are displayed on the website of the online retailer; and
 excluding the second module unassociated with the first product from only the first modularized product content for the first product;

generating an updated modularized product content for the first product using the one or more rules, as updated;

replacing the first modularized product content for the first product with the updated modularized product content for the first product; and coordinating displaying, on the website of the online retailer, of:
 the first product; and
 the updated modularized product content for the first product.

13. The method of claim 12, wherein:

continually receiving the respective initial product content comprises:
 continually receiving, by a product content enrichment service system, the respective initial product content for each respective product of the plurality of products;

generating the respective modularized product content comprises:
 generating, by the product content enrichment service system, the respective modularized product content from the respective initial product content, the respective modularized product content configured for displaying on the website of the online retailer;

storing the respective modularized product content comprises:
 storing, by a product data store comprising the one or more non-transitory computer-readable media, the respective modularized product content for the plurality of products, wherein the storing comprises transmitting the respective modularized product content from the product content enrichment service system to the product data store;

receiving the error report comprises:
 receiving, by a configuration database and from the website, the error report of the one or more errors in the first modularized product content for the first product displayed on the website of the online retailer;

updating the one or more rules comprises:
 updating, on the configuration database, the one or more rules to correct the one or more errors in the first modularized product content for the first product;

generating the updated modularized product content comprises:
 generating, by the product content enrichment service system, the updated modularized product content for the first product using the one or more rules, as updated, from the configuration database; and replacing the first modularized product content comprises:
 replacing, in the product data store, the first modularized product content for the first product with the updated modularized product content for the first product.

14. The method of claim 13, wherein:
the product content enrichment service system, the product data store, and the configuration database comprise at least one of the one or more processors or the one or more non-transitory computer-readable media.

15. The method of claim 12, wherein:
the one or more processors comprise a plurality of processors;
the one or more non-transitory computer-readable media comprise a plurality of non-transitory computer-readable media;
the method is implemented via execution of the computing instructions configured to run at one or more of:
 (1) a product content enrichment service system comprising a first processor of the plurality of processors and a first non-transitory computer-readable media of the plurality of non-transitory computer-readable media;
 (2) a product data store comprising a second processor of the plurality of processors and a second non-transitory computer-readable media of the plurality of non-transitory computer-readable media;
 (3) a configuration database comprising a third processor of the plurality of processors and a third non-transitory computer-readable media of the plurality of non-transitory computer-readable media; and
 (4) a workflow scheduler system comprising a fourth processor of the plurality of processors and a fourth non-transitory computer-readable media of the plurality of non-transitory computer-readable media;

continually receiving the respective initial product content comprises:
 continually receiving, by the product content enrichment service system, the respective initial product content for each respective product of the plurality of products;

generating the respective modularized product content comprises:
 generating, by the product content enrichment service system, the respective modularized product content from the respective initial product content for displaying on the website of the online retailer from the respective initial product content;
storing the respective modularized product content comprises:
storing, by the product data store, the respective modularized product content for the plurality of products;
receiving the error report comprises:
receiving, by the configuration database, the error report of the one or more errors in the first modularized product content for the first product displayed on the website of the online retailer;
updating the one or more rules comprises:
updating, on the configuration database, the one or more rules to correct the one or more errors in the first modularized product content for the first product;
the method further comprises:
retrieving a product identification for the first product from the product data store;
generating the updated modularized product content comprises:
generating, by the product content enrichment service system, the updated modularized product content for the first product using the one or more rules as updated from the configuration database; and
replacing the first modularized product content comprises:
replacing, in the product data store, the first modularized product content for the first product with the updated modularized product content for the first product.

16. The method of claim 15, wherein:
the method further comprises:
transmitting the product identification for the first product from the workflow scheduler system to the product content enrichment service system;
retrieving, by the product content enrichment service system, first initial product content for the first product from an additional data store using the product identification for the first product; and
generating, by the product content enrichment service system, the updated modularized product content comprises:
generating, by the product content enrichment service system, the updated modularized product content for the first product by applying the one or more rules, as updated, from the configuration database to the first initial product content for the first product, as retrieved, from the additional data store.

17. The method of claim 16, wherein:
receiving the error report further comprises:
transmitting the error report of the one or more errors to a validation terminal; and
receiving, from the validation terminal, a validation of the one or more errors;
retrieving the product identification comprises:
in response to receiving the validation of the one or more errors, automatically retrieving, by the workflow scheduler system, the product identification for the first product from the product data store; and
generating the updated modularized product content comprises:
automatically generating, by the product content enrichment service system, the updated modularized product content for the first product by applying the one or more rules as updated from the configuration database to the first initial product content for the first product received from the additional data store responsive to receiving the product identification for the first product from the workflow scheduler system.

18. The method of claim 12, further comprising:
receiving additional product content for the first product;
generating additional modularized product content for the first product using:
the one or more rules, as updated; and
the additional product content;
storing the additional modularized product content for the first product in the one or more non-transitory computer-readable media; and
coordinating displaying, on the website of the online retailer:
the first product;
the additional modularized product content; and
the updated modularized product content for the first product.

19. The method of claim 12, the one or more errors in the first modularized product content for the first product comprises at least one of:
(1) inclusion of the first modularized product content for the first product on a shelf of the website of the online retailer;
(2) exclusion of the first modularized product content for the first product on the shelf of the website of the online retailer;
(3) inclusion of an attribute in the first modularized product content for the first product;
(4) exclusion of the attribute in the first modularized product content for the first product;
(5) inclusion of an attribute value in the first modularized product content for the first product; or
(6) exclusion of the attribute value in the first modularized product content for the first product.

20. The method of claim 12, wherein receiving the error report comprises:
receiving the error report that a user of the website has reported the one or more errors for the first modularized product content for the first product displayed on the website of the online retailer.

21. The method of claim 12, wherein continually receiving the respective initial product content for each respective product of the plurality of products comprises:
receiving at least one of:
(1) respective initial product content for one or more new products of the plurality of products; or
(2) respective additional initial product content for one or more existing products of the plurality of products.

22. The method of claim 12, wherein:
the one or more processors comprise a plurality of processors;
the one or more non-transitory computer-readable media comprise a plurality of non-transitory computer-readable media;
the method is implemented via execution of the computing instructions configured to run at one or more of:
(1) a product content enrichment service system comprising a first processor of the plurality of processors and a first non-transitory computer-readable media of the plurality of non-transitory computer-readable media;
(2) a product data store comprising a second processor of the plurality of processors and a second non-transitory computer-readable media of the plurality of non-transitory computer-readable media;
(3) a configuration database comprising a third processor of the plurality of processors and a third non-transitory computer-readable media of the plurality of non-transitory computer-readable media; and
(4) a workflow scheduler system comprising a fourth processor of the plurality of processors and a fourth non-transitory computer-readable media of the plurality of non-transitory computer-readable media;

continually receiving the respective initial product content comprises:
receiving, by the product content enrichment service system, at least one of:
(1) respective initial product content for one or more new products of the plurality of products; or
(2) respective additional initial product content for one or more existing products of the plurality of products;

generating the respective modularized product content comprises:
generating, by the product content enrichment service system, the respective modularized product content from the respective initial product content for displaying on the website of the online retailer;

storing the respective modularized product content comprises:
storing, by the product data store, the respective modularized product content for the plurality of products;

receiving the error report comprises:
receiving, by the configuration database, the error report that a user of the website has reported the one or more errors in the first modularized product content for the first product displayed on the website of the online retailer;
transmitting the error report of the one or more errors to a validation terminal; and
receiving, from the validation terminal, a validation of the one or more errors;

updating the one or more rules comprises:
updating, on the configuration database, the one or more rules to correct the one or more errors in the first modularized product content for the first product;

replacing the first modularized product content comprises:
replacing, in the product data store, the first modularized product content with the updated modularized product content for the first product;

the method further comprises:
retrieving first initial product content for the first product from an additional data store using a product identification for the first product;
receiving, by the product content enrichment service system, additional product content for the first product; and
generating, by the product content enrichment service system, additional modularized product content for the first product using:
the one or more rules, as updated; and
the additional product content;
in response to receiving the validation of the one or more errors, automatically retrieving the product identification for the first product from the product data store;
automatically generating, by the product content enrichment service system, the updated modularized product content for the first product by applying the one or more rules, as updated, from the configuration database to the first initial product content for the first product retrieved from the additional data store responsive to receiving the product identification for the first product from the workflow scheduler system;
storing the additional modularized product content for the first product; and
coordinating displaying, on the website of the online retailer, the updated modularized product content; and the one or more errors in the first modularized product content for the first product comprises at least one of:
(1) inclusion of the first modularized product content for the first product on a shelf of the website of the online retailer;
(2) exclusion of the first modularized product content for the first product on the shelf of the website of the online retailer;
(3) inclusion of an attribute in the first modularized product content for the first product;
(4) exclusion of the attribute in the first modularized product content for the first product;
(5) inclusion of an attribute value in the first modularized product content for the first product; or
(6) exclusion of the attribute value in the first modularized product content for the first product.

* * * * *